Patented Jan. 19, 1932

1,841,547

UNITED STATES PATENT OFFICE

ANTON L. V. NILSSON, OF TULAROSA, NEW MEXICO

PLASTIC-FORMING COMPOSITION

No Drawing.   Application filed March 26, 1930.   Serial No. 439,224.

The invention aims to provide a new and improved composition which when mixed with water and allowed to set, will produce a structure equivalent to Portland cement work for either exposed or interior construction, yet will be much less expensive.

A further aim is to provide for the production of the composition in a form which will be particularly economical and desirable for plastering or for the formation of building units or other structures which require somewhat less density and strength than most exposed structures.

Yet another aim is the provision of a composition which will enable vast natural resources to be applied to a useful purpose for which they have not previously been employed.

The materials used in manufacture are:
1. Flint rock.
2. Quick lime rock.
3. Crystallized white sand or rock (gypsum).
4. Sawmill offal.

These ingredients will be described and the ways of preparing them explained in the following paragraphs bearing the same numbers as those above given said ingredients.

1. The flint rock which I have found most desirable exists in a ridge about sixty miles long and at some points several miles wide, and about twenty feet deep average, a short distance from Tularosa, New Mexico, towards the north. It is substantially black with a gray tendency, is very hard and exists naturally in a calcined state. Its chemical analysis shows:

|  | Per cent |
|---|---|
| Silica ($SiO_2$) | 48.8 |
| Calcium oxide | 8.8 |
| Magnesium oxide | 4.9 |
| Iron and aluminum oxide | 32.8 |
| Sulphates ($SO_3$) | 0.3 |
| Loss on ignition | 0.7 |
|  | 96.3 |
| Undetermined | 3.7 |

2. Any quick lime rock of fairly good quality will suffice. That which I prefer to use exists abundantly near Tularosa, New Mexico, within mountainous formations.

3. The crystallized white sand or rock (gypsum) which I prefer, exists near Tularosa, New Mexico, in a mass extending over about one hundred and thirty-eight thousand acres and of an average depth of about twenty-five feet. Chemically, it varies. Near the northern part of the mass mentioned, it contains 76.7% of calcium sulphate mixed with iron, aluminum, mica, clay and magnesia, while toward the south about 95% pure gypsum exists in its composition.

4. The sawmill offal is preferably bark or rind, as it contains more gum than sawdust, shavings, etc. However, the latter could be used.

1. The flint rock is crushed until it will pass through a 200 mesh screen and is stored in a bin protected from moisture, until its use is needed.

2. The quick lime rock is calcined preferably at a temperature ranging between 2200° and 3000° Fahrenheit and after this operation, is crushed until it will pass through a 200 mesh screen. It is then stored in a separate bin protected from moisture, until its use is needed.

3. The crystallized white sand or rock (gypsum) is calcined at a temperature preferably about 340° Fahrenheit and such temperature should never exceed 395°. It is crushed after calcination until it will pass through a 200 mesh screen, and until its use is required, is stored in a separate bin protected from moisture.

4. The sawmill offal is sun-dried or calcined and ground until it will pass through a screen of about 14 mesh and is stored in a dry bin or the like.

The first three ingredients prepared as above described, are thoroughly mixed dry and sacked, in readiness for market, the proportions used being about but not necessarily as follows:

|  | Per cent |
|---|---|
| Crushed flint rock | 36 |
| Crushed calcined quick lime rock | 36 |
| Crushed calcined crystallized white sand or rock (gypsum) | 28 |

The material thus formed, when mixed with water, produces a plastic which is usable in any way in which Portland cement is now used, and will possess equal strength and durability.

For plastering and other interior use or wherever else practicable, the dried and ground sawmill offal may be added, the percentages of ingredients being then about but not necessarily as follows:

| | Per cent |
|---|---|
| Crushed flint rock | 33 |
| Crushed calcined quick lime rock | 33 |
| Crushed calcined crystallized white sand or rock (gypsum) | 24 |
| Dried and ground sawmill offal | 10 |

The material, either omitting or embodying the sawmill offal, may be used to advantage either with water alone, or mixed with sand, gravel, cinders, etc. in any of the customary ways in which these and analogous materials are now mixed with Portland cement. When the sawmill offal is used, the set material is of such nature as to readily allow the driving of nails or the like into it yet is an efficient resister to breaking, crushing and other strains.

I claim:

1. A substitute for hydraulic cement, comprising the following ingredients in substantially the proportions given: crushed flint rock 36%, crushed calcined quick lime rock 36%, and 28% crushed gypsum calcined at a temperature ranging from substantially 340° to 395° Fahrenheit.

2. A plastic-forming material comprising the following ingredients in substantially the proportions given: crushed flint rock 33%, crushed calcined quick lime rock 33%, dried and ground tree bark or rind 10%, and 24% crushed gypsum calcined at a temperature ranging from substantially 340° to 395° Fahrenheit.

In testimony whereof I have hereunto affixed my signature.

ANTON L. V. NILSSON.